United States Patent [19]
Lefever

[11] 3,952,529
[45] Apr. 27, 1976

[54] EARTHQUAKE FAULT ZONE PIPELINE CONSTRUCTION METHOD AND ARRANGEMENT

[76] Inventor: Kenneth W. Lefever, Waterford, Va. 20246

[22] Filed: Apr. 12, 1974

[21] Appl. No.: 460,592

[52] U.S. Cl. ................................ 61/72.1; 61/43; 61/50; 52/167; 52/105
[51] Int. Cl.² .................. E02D 27/46; E02D 31/00; F16L 1/00
[58] Field of Search .................. 61/72.1, 43, 42, 50, 61/45; 52/167; 138/105, 106

[56] References Cited
UNITED STATES PATENTS

| | | | |
|---|---|---|---|
| 845,046 | 2/1907 | Bechtold | 52/167 |
| 2,007,969 | 7/1935 | Grodsky | 61/72.1 |
| 3,675,432 | 7/1972 | Keene | 61/72.1 |

*Primary Examiner*—Jacob Shapiro
*Attorney, Agent, or Firm*—Bacon & Thomas

[57] ABSTRACT

Where a pipeline is to cross an earthquake fault zone, a trench is dug in the earth substantially wider and deeper than the diameter of the pipeline. The pipeline is installed in the trench in a bed of spherical bodies, which thereafter function during an earthquake to partially absorb compression and shear waves, and to disperse forces acting on the pipeline, whereby the effect of such forces on the pipeline is minimized with the result that rupture does not occur.

15 Claims, 11 Drawing Figures

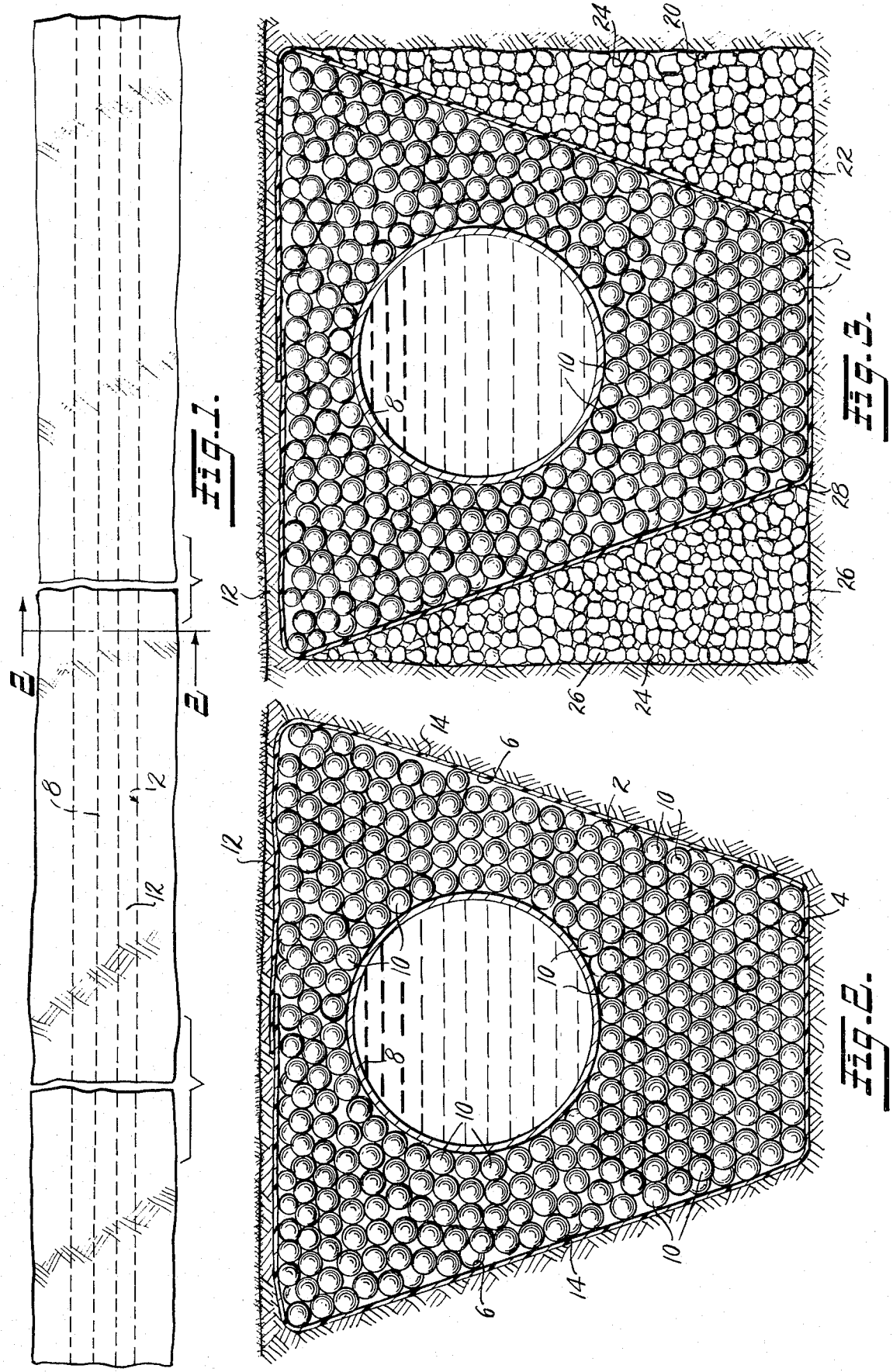

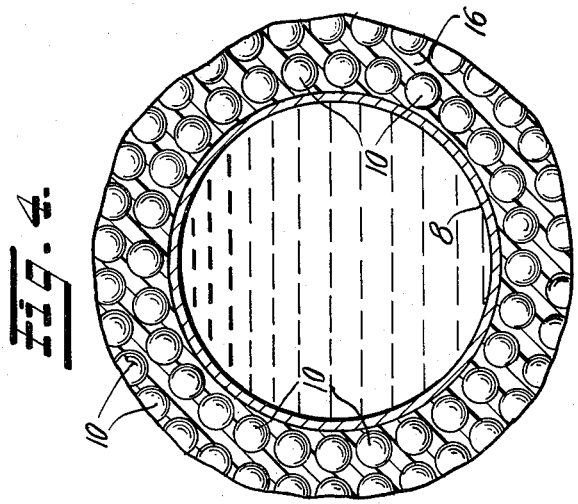
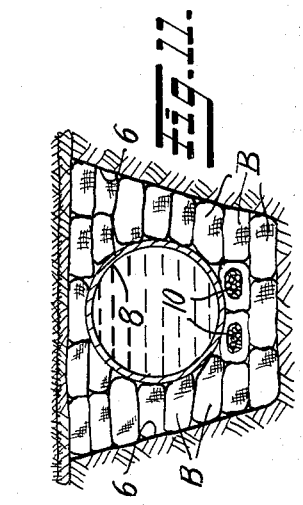
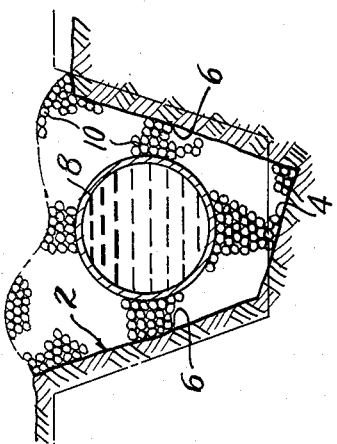
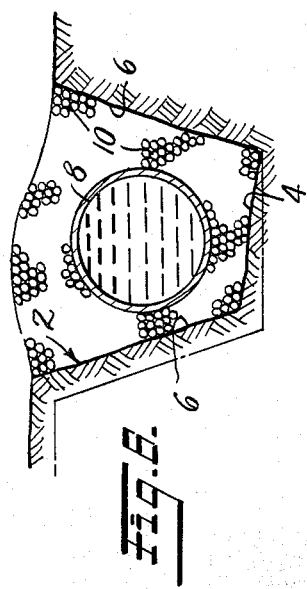
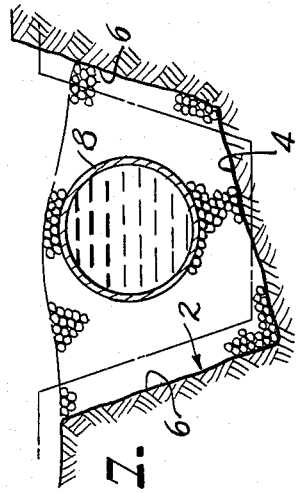
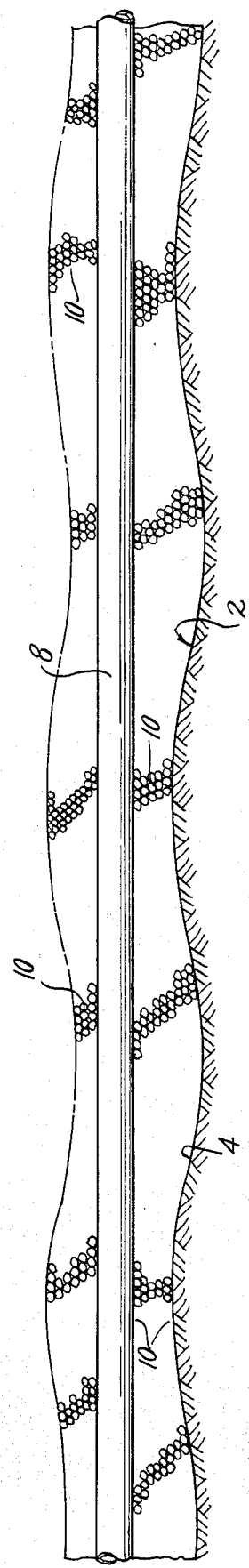

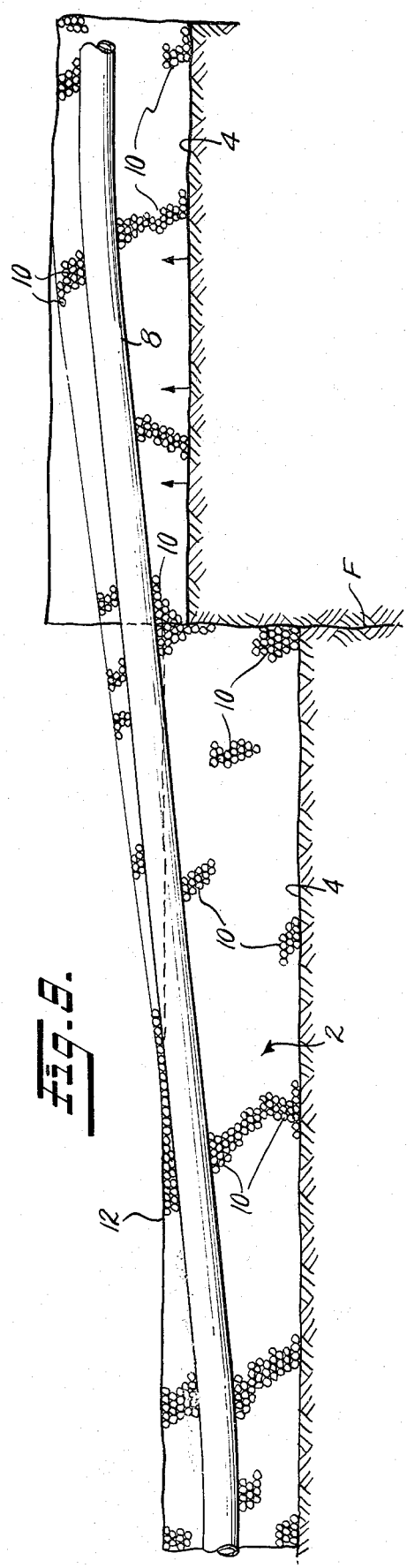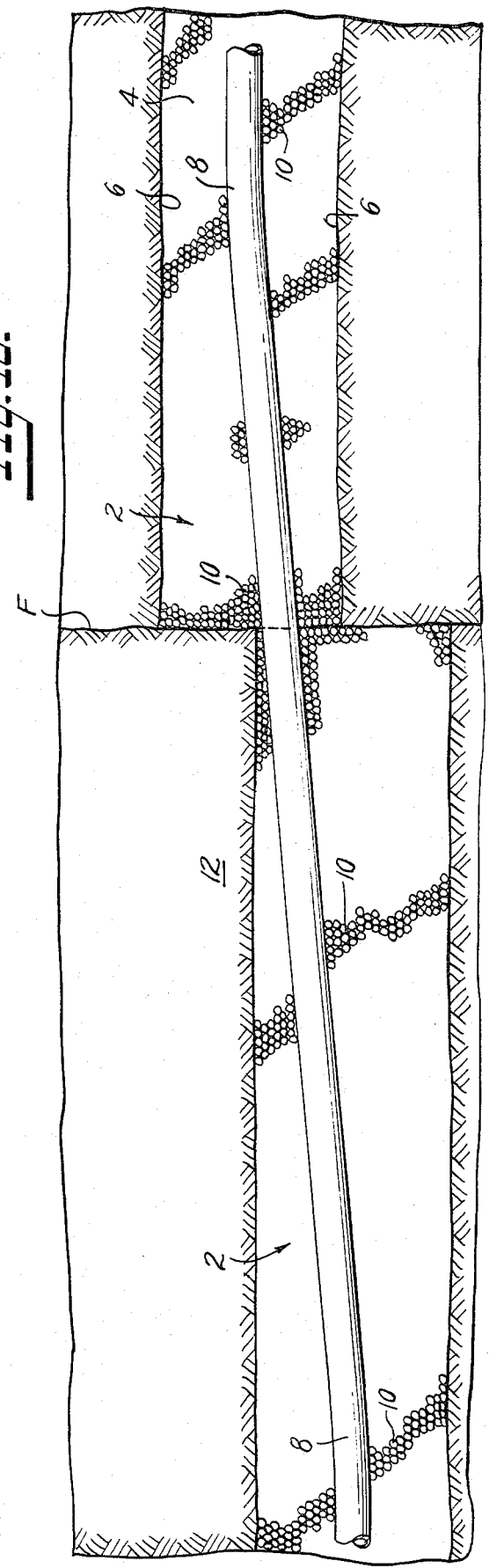

EARTHQUAKE FAULT ZONE PIPELINE CONSTRUCTION METHOD AND ARRANGEMENT

BACKGROUND OF THE INVENTION

1. Field of the Invention

The present invention relates generally to methods and arrangements for installing a pipeline through an earthquake fault zone, whereby damage to the pipeline during an earthquake is minimized. More particularly, the invention relates to a novel method and arrangement utilizing a bed of spherical bodies that acts to partially absorb and disperse earthquake compression and shear waves, thereby enabling the pipeline to survive an earthquake unruptured.

2. Description of the Prior Art

The art of laying pipelines is well known, and pipelines are today installed in various sizes to transport water, oil, natural gas, coal slurries and the like. In the normal pipeline installation process a trench is dug, the pipeline is laid in the trench, and then the open trench is backfilled with the excavated material. Efforts to improve the conventional installation method have been undertaken, such as that shown in U.S. Pat. 3,568,455, wherein vertical standards are installed to hold the pipeline suspended above the bottom of the trench, and a fill material such as gravel or crushed rock is then placed around the pipeline, with excavated material placed above.

When pipelines are installed by conventional or even such improved methods through an earthquake fault zone, and an earthquake occurs, it is common for the pipeline to be ruptured by the shifting of the earth. When this happens disruption of service occurs, and in addition ecological damage can result. The latter result can be especially severe in the instance of a large diameter pipeline running through a relatively isolated area, and carrying a product such as crude oil. In particular, there is concern about such possible ecological damage in Alaska pipeline projects, which can cross several known earthquake faults.

Up to the present there has been inadequate attention paid to the construction of pipelines across earthquake fault zones, and indeed no method or arrangement is known that can satisfactorily accommodate for the occurrence of a major earthquake, and which at the same time is practical in use. The present invention is intended to satisfy the need for such a method and arrangement.

SUMMARY OF THE INVENTION

The method and arrangement of the present invention make use of a bed of spherical bodies, in which the pipeline is suspended as it passes through an earthquake fault area. If properly installed, a pipeline laid according to the teachings of the invention will directly receive little of the stresses generated by compression waves and shear action during an earthquake, and as a result will normally survive the event unruptured.

The spherical bodies utilized in the invention are noncohesive, of relatively small diameter compared to the diameter of the pipeline, and behave much like a liquid as long as they are essentially unrestrained in at least one surface. Acting much like a liquid, the spheres are not effective to transmit shear forces or compressive forces to the pipeline, but rather tend to flow around the pipeline in the presence of such earthquake-generated forces.

In the invention a trench is dug in the normal manner through the earthquake zone, but the width and depth thereof are chosen to allow adequate movement of the trench walls and the spherical bodies about the pipeline. Normally, a trench width twice the horizontal movement expected plus the diameter of the pipeline is utilized, and the depth is chosen to accommodate the anticipated vertical displacement that will occur under the pipeline, plus the diameter of the pipeline, plus the depth required for adequate cover over the pipeline. Preferably, the sidewalls of the trench are upwardly and outwardly sloped, to facilitate the liquid-like upward movement of the spherical bodies during an earthquake.

It is, of course, necessary to prevent entry of water into the mass of spherical bodies in areas where sub-freezing temperatures occur, since freezing water would render the invention inoperative. To accomplish this result the trench can be lined with plastic sheeting or the like, or in the alternative the spherical bodies can be suspended in a non-freezing gel that simply bars the entry of water and other foreign matter in the interstices between them.

It is the principal object of the present invention to provide a method and arrangement for constructing a pipeline across an earthquake fault zone, designed to accommodate for compression waves and shear actions generated by an earthquake so that rupture of the pipeline will normally not occur.

Another object is to provide such an earthquake-proof pipeline construction method and arrangement that is both practical and economical to use, and that requires no special trenching or other special installation apparatus.

Other objects and many of the attendant advantages of the invention will become readily apparent from the following Description of the Preferred Embodiments, when taken in conjunction with the accompanying drawings.

BRIEF DESCRIPTION OF THE DRAWINGS

FIG. 1 is a fragmentary diagrammatic plan view of a pipeline installation made according to the present invention;

FIG. 2 is an enlarged vertical sectional view taken on the line 2—2 of FIG. 1, and showing how the pipeline lies suspended within a bed of spherical bodies;

FIG. 3 is a vertical sectional view similar to FIG. 2, but showing a modification of the pipeline assembly wherein a trench with vertical walls is utilized, gravel or stone or the like being installed behind waterproof sheet material to provide the sloped walls for the bed of spherical bodies;

FIG. 4 is a fragmentary vertical sectional view showing a modification of the invention, wherein the spherical bodies are suspended in a gel;

FIG. 5 is a longitudinal sectional diagrammatic view showing the displacement of the spheres at an instant in time during the passage of an earthquake-generated compression wave;

FIGS. 6, 7 and 8 are transverse vertical sectional views diagrammatically illustrating successive appearances of the pipeline trench and the bed of spherical bodies during an earthquake-generated compression wave passing normally to the length of the pipeline;

FIG. 9 is a fragmentary diagrammatic vertical sectional view showing the displacement of the pipeline, the trench walls and the bed of spherical bodies during a vertical earthquake-generated shearing action;

FIG. 10 is a fragmentary diagrammatic plan view showing the displacement of the pipeline, the trench walls and the bed of spherical bodies during a lateral earthquake-generated shearing action; and FIG. 11 is a fragmentary view showing the spherical bodies encased in a flexible bag, for easy handling.

DESCRIPTION OF THE PREFERRED EMBODIMENTS

Before turning to a detailed description of the method and arrangement of the invention, some discussion of the seismic forces acting on a pipeline during an earthquake is in order. A buried pipeline subjected to earthquake forces is normally stressed in several ways, depending, in part, on the location of the center of the seismic disturbance in relation to the traverse of the pipeline and, in part, on the types of soils encountered. But in every instance there will normally be two general types of surface earthquake waves involved, these being compressive waves and shear waves.

Turning first to compression waves, these can be subdivided into two types, those in which the ground particles vibrate in vertical ellipses in such a direction that when at the top of the ellipse they are moving opposite to the travel direction of the wave, and those in which the ground particle motion is to and fro in a straight line parallel to the direction of travel. In the case of the second type of compressive wave causing to and fro particle motion, as such a wave passes a given point the earth is alternately compressed and stretched.

A buried pipeline under stabilized conditions can be considered as a beam with continuous support and a uniformly distributed load factor. When it is subjected to the undulating ground motion caused by the elliptical movement of the ground occurring during the first type of compression wave it then becomes a continuous beam supported at irregular intervals, with the supporting locations constantly changing in the direction of and with the speed of travel of the wave. The loading also becomes irregular in the presence of the earthquake wave, varying at the same speed as that of the wave, increasing from zero at one temporary support to a maximum positive moment between supports, and changing to a maximum negative moment between adjacent temporary supports. This movement of supports and load variations results in a whiplash action along the length of the pipeline, which may be damaging since the pipeline with a relatively long natural vibration frequency attempts to adjust to the usually shorter seismic frequencies. This action, if sufficiently severe, can cause the outer fibers of the pipeline walls to fail in tension.

The second type of compression wave, with its to and fro compression and tension effect, can also cause failure as the pipe walls are alternately elongated and compressed during the flexing action described above.

Turning now to shear waves, these are of course disposed generally normal to the pipeline, and can often cause rapid pipeline failure. The pipeline is no longer continuously supported when the earth shifts in the fault zone either vertically or laterally during a shear action, which action causes a displacement of the soils along the interface of a non-moving earth segment and a moving earth segment. The unmoving earth segment encases and thereby prevents one portion of the pipeline (acting as a beam) from moving, and yet the adjacent earth segment rapidly moves to the unmoving earth segment, carrying another portion of the pipeline therewith. The pipeline thus is subjected to a concentrated shear force at the interface of the two bodies, which can be fatal to its integrity.

The total number and values of the stresses generated by an earthquake are far more complex than the compression and shear forces just described, but if the effect on the pipeline of the maximum compressive and shear forces can be lessened to a degree that avoids failure of the pipeline, then the effect of the other stresses can normally be endured without problem. The problem, then, is to so design the pipeline installation that the two types of compressive waves and the shear waves can be accommodated in an earthquake falut region.

There are several criteria or assumptions that are adopted in dealing with the design problem solved by the invention, and these include the following:

1. Earthquake compression waves cause the material through which they pass to change volume, but retain the same shape.
2. Earthquake shear waves cause the material through which they pass to change shape, but retain the same volume.
3. Liquids cannot effectively transmit shear forces.
4. Gravity is a constant downward force.
5. A structure tends, by inertia, to remain in place unless acted upon by an outside force.
6. A body of non-cohesive, freely-separated spheres will behave as a liquid if relatively unrestrained on at least one surface.
7. If such spheres are of the proper design and/or if proper care is taken in installation, they will not become "quick" under normal vibrations from internal fluid movements or light earth tremors.

In addition to these criteria and assumptions, with respect to the pipeline itself it is assumed that:

1. The pipeline is somewhat elastic.
2. The pipeline is essentially anchored at each end.
3. A reasonable estimate of maximum earth displacement expected during an earthquake in the fault zone can be made.
4. The pipeline will be so laid that abrupt directional changes will not be made in the earthquake fault zone, i.e., the pipeline will be generally straight running through the fault zone.

With this background, reference is now made to FIGS. 1 and 2 of the drawing, wherein the method and arrangement of the earthquake-proof construction of the invention is illustrated. In practicing the invention a trench 2 is dug in the earth using conventional methods, and preferably is provided with a flat bottom wall 4 and upwardly and outwardly sloped sidewalls 6. It has been found that the width of such a trench 2 crossing an earthquake fault zone should be twice the horizontal movement expected during the earthquake, plus the diameter of the pipe, it being assumed that the pipeline will be installed centered in the trench. The depth of the trench 2 should be adequate to accommodate the maximum anticipated vertical displacement under the pipeline, plus the diameter of the pipeline, plus the required depth of cover material.

A pipeline 8 is shown in the drawings, which is constructed in the usual manner, normally from steel. Before the pipeline 8 is placed in the trench 2, a quantity of spherical bodies 10 is placed in the trench sufficient to support the pipeline in the desired centered installed location, after which the pipeline 8 is laid into the trench. Then the balance of the open trench is filled with the spherical bodies 10, such that the bodies are in physical contact with each other. Sod 12 is then placed over the bed of spherical bodies 10, adequate to protect the installation, but to a minimum depth so that in effect little or no restraint is placed on the upward movement of the spherical bodies 10 under earthquake-generated forces.

The spherical bodies 10 are to be substantially non-cohesive with respect to each other, and can be made of any suitable material, including ceramic, plastic, recycled glass, concrete (regular or lightweight), breakage from brick or concrete block plants, solid waste materials from demolished structures, compressed garbage, or the like. The material chosen is shaped as required by the characteristics thereof, by molding, casting, a tumbling cylinder, or by a combination of these methods, or some other method.

In order to help accommodate the first shocks from an earthquake, it may be desirable to make some of the spherical bodies 10 crushable, particularly those that are placed immediately about the pipeline 8. This can be done by utilizing hollow spheres, or by another suitable design, care being taken so that the strength of such crushable spherical bodies is adequate to retain their integrity under normal stress conditions.

The diameter chosen for the spherical bodies 10 is not too critical, except that if they are too small in relation to the size and weight of the pipeline 8 the pipeline may tend to settle under constant vibration, and if too large, some of the liquid-like qualities of the bed of spherical bodies may be lost. An optimum size appears to be approximately a ratio of about 2 to 25 compared to the diameter of the pipeline, or a four-inch diameter spherical body 10 for a forty-eight inch diameter pipeline 4. It is not required that all the spherical bodies 10 be of exactly the same diameter, or exactly spherical.

In placing the spherical bodies 10, they are preferably installed in the bottom of the trench a layer at a time, so that the spherical bodies of one layer lie in the spaces formed between the spherical bodies of the layer therebeneath. The sloped widewalls 6 of the trench 2 serve the dual function of reducing the quantity of spherical bodies 6 required, and facilitating the upward movement of the bodies during the application of earthquake-generated forces. Remembering that the spherical bodies 10 are preferably laid in layers as described, a preferred slope for each sidewall 6 to accommodate the bodies is a horizontal displacement of one-half the diameter of a spherical body 10 for a vertical distance equal to the diameter of such a body.

It is desirable to exclude ground and rain water from the bed of spherical bodies 10 in areas where freezing can occur, since if such freezing would happen the bed of spherical bodies would be rendered inoperative. To accomplish this, the trench 2 is lined with sheeting material 14 of plastic or the like, encasing the spherical bodies 10 and sealed against leakage. An alternative approach for solving this problem is shown in FIG. 4, wherein the spherical bodies 10, while still in contact with each other, are suspended in a suitable, non-freezing gel 16 that prevents the entry of water or other foreign substances therebetween and which tends to prevent movement of the bodies under slight pipe or earth movements. Such thixotropic gels are known, one gel being a suspension of ferrous hydroxide, which has the characteristic of being liquid when installed, of solidfying to a self-supporting state, but becoming liquid again under sufficient force or agitation. The gel would hold the spherical bodies 10 in place under normal conditions, but would allow for their free movement under agitation or movement forces associated with an earthquake. The gel's fluid to solid characteristic is reversable, and repeatable.

There are additional design techniques if the thixotropic gel is not used that can be applied to the spherical bodies 10 to lessen any settlement tendencies of the pipeline 8 caused by vibrations, or the like. For example, the second and third layers of spherical bodies 10 directly under the first sphere layer upon which the pipeline 8 lays may be coated with a slightly tacky adhesive sufficiently strong to resist small forces, but easily overcome under seismic forces of any substantive magnitude. Or the spherical bodies 10 can be manufactured with a rough surface to prevent them from becoming "quick", so that they roll, rather than slide, on each other. Another approach is to have the spherical bodies 10 immediately under the pipeline 8 made slightly elastic, so that they can compress and deform to absorb vibration energy. A further possibility is to install a layer of heavy duty paper or the like under the first layer of spherical bodies 10 carrying the pipeline 8, creating a frangible barrier that will prevent small vertical movements of the spherical bodies due to internal fluid vibrations, but which will fail under conditions occurring during an earthquake.

It may be desirable to dig the trench with vertical rather than sloping walls, for reasons of available equipment and economy. FIG. 3 shows such a trench at 20, including a flat bottom wall 22 and vertical sidewalls 24. In this instance the desired sloping walls for the spherical bodies 10 are established by partially filling the trench with gravel or sand 26, waterproof sheeting 28 being installed thereover. The backfill material 26 utilized for forming the sloping walls can also be made up of spherical bodies, if desired, preferably of a less expensive type than the spherical bodies 10 to reduce the costs of installation.

The manner in which the installation of the invention functions during an earthquake will now be described, first as respect to earthquake-generated compression waves. Reference is made for this purpose to FIG. 5, which shows the pipeline of the invention diagrammatically, as an earthquake compression wave moves along the length thereof.

As is seen in FIG. 5, vertical undulations of the earth under the trench bottom 4 will cause the bottom layer of spherical bodies 10 to rise and push against the next above layer, and so on up through the mass of bodies 10. This force will be directionally dissipated since the vertical force is transmitted by spherical bodies acting on spherical bodies, and not in the same vertical line; should two spheres be in point contact along a vertical line, one or the other will quickly shift out of such alignment when force is applied. The accumulation of angular displacement of the vertical force at each layer of spherical bodies 10 plus the friction of the side walls 6 of the trench 2, which are rising at the same rate as the trench bottom wall 4, will result in the laterally outer tiers of spherical bodies 10 reaching the top of the trench 2 first. This more rapid movement on either side of the pipeline 8 will allow the spherical bodies 10 pushing upwards towards the bottom of the pipeline 8 to move slightly sideways, thus reducing the force exerted on the pipeline. A layer of crushable spheres next to the pipeline 8, as has been mentioned, would allow the first impact of the earthquake wave to be lessened even more effectively. When such crushable spherical bodies are used the liquid action is modified, however, and so care must be taken in using such bodies and in properly placing such in the bed. Once the spherical bodies 10 have reached the top of the trench 2, with some probably being ejected from the trench along with the sod covering 12, the remaining spherical bodies 10 moving upwards under the pipeline 8 roll around the pipeline, and resume upward movement.

The immediately following downward movement of the earth, as the longitudinal compression wave progresses, will allow the spherical bodies 10 to move downwardly. This movement will be more rapid than the downward movement of the pipeline 8, which is subject to greater inertia due to its being anchored at either end and the temporary supports formed by the upward portions of the wave on either side of the region of downward movement. The settling spherical bodies 10 will roll under the pipeline 8, slowing the pipeline's descent and stopping the downward movement thereof before the maximum stress is reached. It is seen that in this process volume changes of the compression wave are translated into geometrical changes.

The effect of a compression wave moving normally to the pipeline, as opposed to parallel therewith, is illustrated in FIGS. 6, 7 and 8, wherein the spherical bodies 10 move much as just described. As the trench walls 4 and 6 are contorted the spherical bodies 10 will roll around the pipeline 8, and since they are essentially unrestrained by the sod covering 12, they can continuously translate the cross section volumetric changes of the trench 2 into the necessary geometrical or shape changes of the mass supporting the pipeline 8.

Referring now to FIGS. 9 and 10, the operation of the invention to prevent damage to the pipeline 8 during vertical and lateral shear actions, respectively, is indicated.

As shown in FIG. 9, shear action at the earthquake fault line F vertically normal to the pipeline 8 releases restraint on the spherical bodies 10 in the vertical plane of the fault. The spherical bodies 10, thus released, will tend to seek their natural angle of repose. The pipeline 8 will be pulled upwards out of the lower section of the trench 2 with little restraint from the sod covering 12 and the covering spherical bodies 10, and the upper segment of the pipeline 8 will settle further into its portion of the trench 2, since the spherical bodies 10 thereunder can easily flow out through the fault displacement into the lower trench segment. Theses actions in effect translate the original shear force into two bending moments, which can be resisted by the normal, somewhat elastic pipeline 8 without such damage as would impair the operation of the pipeline.

Horizontal slip faults, as shown in FIG. 10, present a somewhat different problem in that the spherical bodies 10 do not become totally unrestrained in a vertical surface. The spherical bodies will move in one direction on one side of the fault, and in the opposite direction on the other side. The result is that the pipeline 8 is pushed to opposing sides of the trench 2 over a rather long length thereof, with the shear force as a result again being translated into two bending moments.

It is thus seen that the bed of spherical bodies 10 acts much like a liquid to absorb and dissipate the earthquake forces, so that their effect on the pipeline is reduced to where rupture of the pipeline is avoided.

The pipeline 8 and its trench 2 will of course have to be repaired and replaced after the earthquake, as would normally be the case. But rupture of the pipeline is avoided, thus avoiding the ecological damage and service disruption normally occurring when an earthquake strikes. Moreover, for lesser seismic shocks, it is probable that the pipeline 8 will itself not be damaged in the least, and that such can merely be reinstalled in a repaired trench structure.

In order to make it easier to transport and place the spherical bodies 10, such can be packaged at the plant or elsewhere into large flexible bags B of net, sheet plastic or the like. The bags of spherical bodies 10 can then simply be placed in the trench, as shown in FIG. 11.

The present method and arrangement thus is of great value in building pipelines across earthquake fault zones. Once a sufficient distance from the zone in both directions has been attained, the pipeline construction can revert to conventional. Obviously, many modifications and variations of the present invention are possible.

I claim:

1. The method of installing a pipeline across an earthquake fault zone whereby earth shocks and shifts in the position of the earth resulting from an earthquake can be accommodated without rupturing the pipeline, comprising the steps of: digging a trench across said zone, said trench being of sufficient width and depth to accommodate the diameter of the pipeline, and to further accommodate expected shifts of the earth that might occur during an earthquake, the sidewalls of said trench being spaced apart a distance substantially greater than the diameter of said pipeline; placing a lower bed of spherical bodies within said trench, up to a depth where it is desired to position a pipeline; laying the pipeline in the trench upon said lower bed of spherical bodies and spaced substantially from the sidewalls of the trench; and filling said trench with an upper bed of said spherical bodies to bury said pipeline, with the top surface of said upper bed of spherical bodies being left substantially unrestrained to allow for substantially free upward vertical movement of one or more of said spherical bodies during an earthquake.

2. The method as recited in claim 1, wherein at least some of said spherical bodies are crushable.

3. The method as recited in claim 2, wherein said crushable spherical bodies are placed immediately about said pipeline, the spherical bodies not placed immediately about said pipeline being less crushable.

4. The method as recited in claim 1, including the further step of waterproofing said installation so that water cannot enter between said spherical bodies.

5. The method as recited in claim 4, wherein said waterproofing is accomplished by encasing said bed of spherical bodies in sheet material.

6. The method of installing a pipeline across an earthquake fault zone, comprising the steps of: digging a trench across said zone, said trench being of sufficient width and depth to accommodate the diameter of the pipeline, and to further accommodate expected shifts of the earth that might occur during an earthquake; placing a lower bed of spherical bodies within said trench, up to a depth where it is desired to position a pipeline; laying the pipeline in the trench upon said lower bed of spherical bodies; filling said trench with an upper bed of said spherical bodies to bury said pipeline; and waterproofing said installation so that water cannot enter between said spherical bodies, by embedding said spherical bodies in a gel.

7. The method as recited in claim 1, including the further, final step of covering said trench with a layer of sod or the like, such covering being readily frangible during an earthquake to permit upward movement of said spherical bodies.

8. A pipeline construction for use across an earthquake fault zone whereby earth shocks and shifts in the position of the earth resulting from an earthquake can be accommodated without rupturing the pipeline, said construction including: a trench dug in the earth across said zone, said trench being of sufficient width and depth to accommodate the diameter of a pipeline to be installed therein, and to further accommodate expected shifts of the earth that might occur during an earthquake, the sidewalls of said trench being spaced apart a distance substantially greater than the diameter of said pipeline; a pipeline disposed in said trench; and a bed of spherical bodies also disposed in said trench about said pipeline, said pipeline being disposed substantially centrally of said bed of spherical bodies and being supported thereby, and being spaced substantially from the sidewalls of said trench, the top surface of said bed of spherical bodies being left substantially unrestrained to allow for substantially free upward vertical movement of one or more of said spherical bodies during an earthquake.

9. A pipeline construction as recited in claim 8, wherein the sidewalls of said trench are sloped upwardly and outwardly to aid in the movement of said spherical bodies during an earthquake.

10. A pipeline construction as recited in claim 8, wherein at least some of said spherical bodies are crushable.

11. A pipeline construction as recited in claim 10, wherein said crushable spherical bodies are placed immediately about said pipeline, the spherical bodies not placed immediately about said pipeline being less crushable.

12. A pipeline construction as recited in claim 8, wherein said bed of spherical bodies is waterproofed to prevent the entry of water therebetween.

13. A pipeline construction as recited in claim 12, wherein said bed of spherical bodies is waterproofed by encasing the same within a waterproof material.

14. A pipeline construction for use across an earthquake fault zone, said construction including: a trench dug in the earth across said zone, said trench being of sufficient width and depth to accommodate the diameter of a pipeline to be installed therein, and to further accommodate expected shifts of the earth that might occur during an earthquake; a pipeline disposed in said trench; and a bed of spherical bodies also disposed in said trench about said pipeline, said bed of spherical bodies being waterproofed to prevent the entry of water therebetween by embedding said bodies in a gel, and said pipeline being disposed substantially centrally of said bed of spherical bodies and being supported thereby.

15. A pipeline construction as recited in claim 8, wherein said spherical bodies are disposed in flexible bags for ease of handling.

* * * * *